United States Patent [19]

Takeuchi

[11] Patent Number: 4,709,593

[45] Date of Patent: Dec. 1, 1987

[54] STEERING MECHANISM FOR AUTOMOBILE

[75] Inventor: Kunio Takeuchi, Aichi, Japan

[73] Assignee: Tokai TRW & Co., Ltd., Aichi, Japan

[21] Appl. No.: 852,796

[22] Filed: Apr. 16, 1986

[30] Foreign Application Priority Data

Apr. 17, 1985 [JP] Japan .................................. 60-81589

[51] Int. Cl.$^4$ ............................................. B62D 3/12
[52] U.S. Cl. ...................................................... 74/498
[58] Field of Search .................... 180/140, 79; 280/96; 74/498

[56] References Cited

FOREIGN PATENT DOCUMENTS

| 59-184060 | 10/1984 | Japan | .................................... 74/498 |
| 60-43471 | 3/1985 | Japan . | |
| 1182719 | 3/1970 | United Kingdom | ................ 280/296 |
| 2096729 | 10/1982 | United Kingdom . | |

Primary Examiner—John A. Pekar
Attorney, Agent, or Firm—Tarolli, Sundheim & Covell

[57] ABSTRACT

There is provided a steering mechanism for an automobile. The steering mechanism comprises a housing defining an opening, a column shaft rotatably mounted in the housing, a pinion on the column shaft, a rack bar engaging the pinion, a first yoke slidable within the opening, a yoke stopper fitted in the opening, a second yoke disposed within the first yoke and having a ring at one end, a first spring interposed between the ring and yoke stopper, and a second spring interposed between the second yoke and yoke stopper.

3 Claims, 6 Drawing Figures

STEERING MECHANISM FOR AUTOMOBILE

BACKGROUND OF THE INVENTION

This invention relates to a steering mechanism for an automobile and more particularly, to an improved steering mechanism for an automobile which is adapted to eliminate excessive play when the automobile is running straight and reduce required steering force when high load is applied to the steering mechanism.

There have been known a variety of prior art steering mechanisms for automobiles and one of the prior art steering mechanisms is shown in FIG. 5 of the accompanying drawings. The prior art steering mechanism generally comprises a housing 1 in which a column shaft 2 is rotatably mounted by means of bearings 3, 3'. A pinion 4 is mounted on the column shaft 2 and a rack bar 5 engages the pinion 4 substantially at right angles to the pinion. The housing 1 defines an opening 6 behind the rack bar 5 and a support yoke 7 is received in the opening 6 for axially slidable movement therein. The support yoke 7 has a roller 8 rotatably mounted within the yoke and a spring 10 is interposed between the support yoke 7 and a yoke stopper 9 fitted in the opening 6 at one or the outer end of the opening so as to normally bias the support yoke 7 towards the rack bar 5.

However, in the prior art steering mechanism having the components constructed and arranged as described hereinabove, the central area 5a of one side of the rack bar 5 is recessed so that the roller 8 will not abut against the rack bar 5, but can abut against the opposite ends 5b of the recessed central area 5a as shown in FIG. 6. Furthermore, in the prior art steering mechanism, the inner end of the support yoke 7 abuts against the central area 5a of the rack bar 5, but does not abut against the opposite ends 5b of the central area.

Therefore, the prior art steering mechanism has the drawback that under high load conditions, the efficiency is low at the central area of the rack bar and when the steering wheel is rotated, the inner end of the support yoke 7 abuts against the central area of the rack bar whereas the roller 8 abuts against the opposite ends of the rack bar central area whereby the abutment relationship with respect to the rack bar transfers between the support yoke and roller and thus, the transfer is not smooth. Furthermore, the prior art steering mechanism has the drawback that in, order to make the rack bar rigid, if the spring 10 applies an increased load thereto, the support yoke contacts the rack bar with an excessively high friction.

SUMMARY OF THE INVENTION

Therefore, the object of the present invention is to provide an improved steering mechanism for an automobile which can eliminate the drawbacks inherent in the prior art automobile steering mechanism as referred to hereinabove.

According to the present invention, a first yoke is slidably received for axial movement in the opening defined in the housing with one end thereof facing the rack bar, a ring is secured to or faces the other end of the first yoke, a yoke stopper is fitted in the opening at the end thereof opposite from the rack bar, a first spring is interposed between the ring and yoke stopper to normally bias the first yoke towards the rack bar, a second yoke is disposed within the first yoke and has a roller at one end thereof for abutting against the rack bar and a second spring is interposed between the other end of the second yoke and the yoke stopper for normally biasing the second yoke towards the rack bar.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

Figure 1:
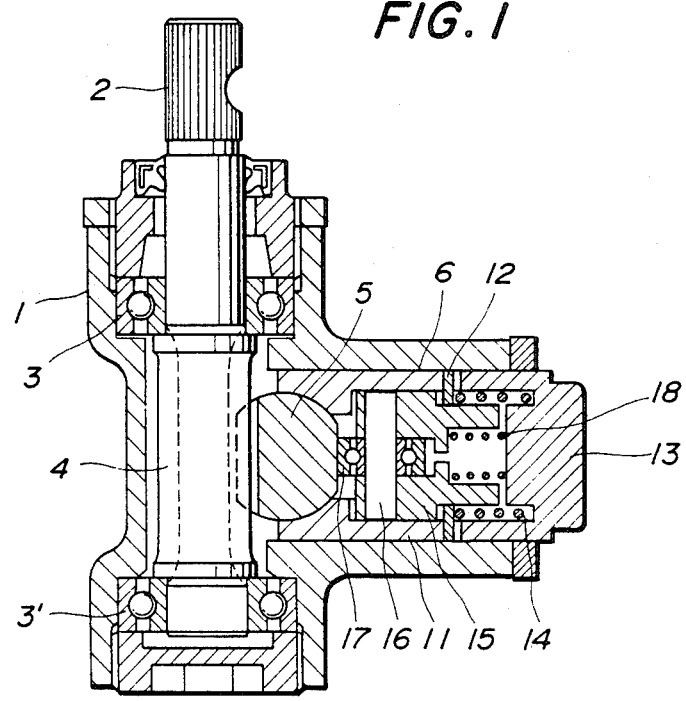
FIG. 1 is a vertically sectional view of a first preferred embodiment of the steering mechanism for an automobile constructed in accordance with the present invention.
Figure 2:
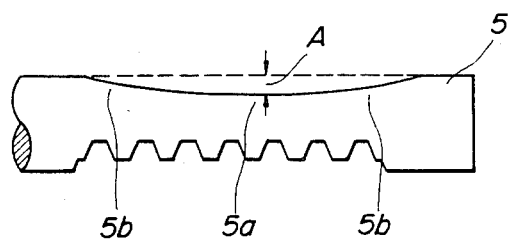
FIG. 2 is a side elevational view of the rack bar employed in said steering mechanism of FIG. 1.
Figure 3:
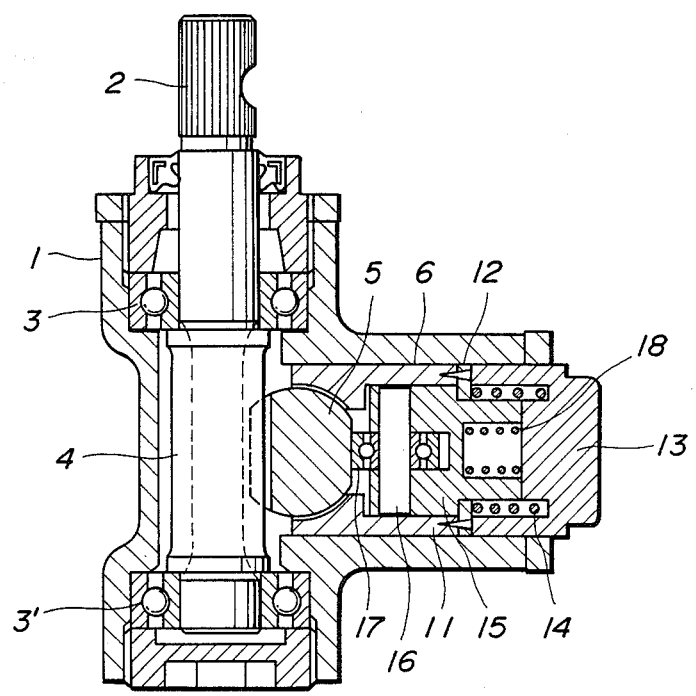
FIG. 3 is similar to FIG. 1, but shows the rack bar in a position displaced from the position of the bar as shown in FIG. 1.

Referring first to FIGS. 1 to 3 inclusive in which the first embodiment of the steering mechanism for an automobile according to the present invention is shown, the steering mechanism generally comprises a housing 1 in which a column shaft 2 is rotatably supported by means of bearings 3, 3' which are in turn supported in the housing 1 in the conventional manner. A pinion 4 is mounted on the column shaft 2 and a rack bar 5 is provided in engagement with the pinion 4 at substantially right angles to the former. An opening 6 is defined in the housing 1 for the purpose to be described hereinafter. The components mentioned above are identical with the respectively corresponding components of the abovementioned prior art steering mechanism and further description on the corresponding components will be omitted herein.

In the first embodiment illustrated in FIGS. 1 to 3 inclusive, a first yoke 11 is received in the opening 6 for axially slidable movement therein and the yoke 11 is adapted to abut at one end thereof against the side of the rack bar 5 opposite from the pinion 4 and the other end of the yoke has a ring 12 secured thereto. A yoke stopper 13 is fitted in the opening 6 at one or the outer end of the opening and a first spring 14 is interposed between the ring 12 and the yoke stopper 13 to normally bias the first yoke 11 and the ring 12 towards the rack bar 5 inwardly in the opening 6. An annular clearance is provided between the outer face of the ring 12 and the inner face of the yoke stopper 13 to allow the first yoke 11 to slide within the opening 6. Disposed within the first yoke 11 is a second yoke 15 which has a rotary shaft 16 mounted at the inner end of the second yoke. A roller 17 is rotatably mounted on the rotary shaft 16 and abuts against the rack bar 5. A second spring 18 is interposed between the yoke stopper 13 and the second yoke 15 to normally bias the roller 17 towards the rack bar 5. An annular clearance is provided between the inner face of the ring 12 and the outer face of the second yoke 15 to allow the second yoke to move axially within the first yoke 11.

In the first embodiment of the automobile steering mechanism according to the present invention having the components constructed and arranged as mentioned hereinabove, as shown in FIG. 2, the central area of the side of the rack bar 5 where the first yoke 11 and the roller 17 abut is recessed as shown by reference numeral 5a and the opposite ends 5b of the recess are gradually curved to provide a difference in level A. As shown in FIG. 1, when the rack bar 5 is in engagement at the central area 5a thereof with the pinion 4, the first yoke 11 and the roller 17 mounted on the second yoke 15 are pressed against the rack bar 5 under the biasing force provided by the first and second springs 14, 18, respectively.

Thus, the rack bar 5 is made rigid under a suitable friction provided by the abutment of the first yoke 11 and the roller 17 against the rack bar 5.

FIG. 3 shows a high load condition under which the inner side of the rack bar 5 engages the pinion 4. However, under this condition, since only the roller 17 mounted on the second yoke 15 abuts against the rack bar 5 at one of the ends 5b of the rack bar 5 and, when the roller 17 frictionally moves downwardly, the second yoke 15 will push the ring 12 and, with it, the first yoke 15 upwardly so as to disengage the first yoke 11 from the rack bar 5.

Thus, under the high load condition, the principal load is born by only the roller 17 to thereby attain a high efficiency.

Figure 4:
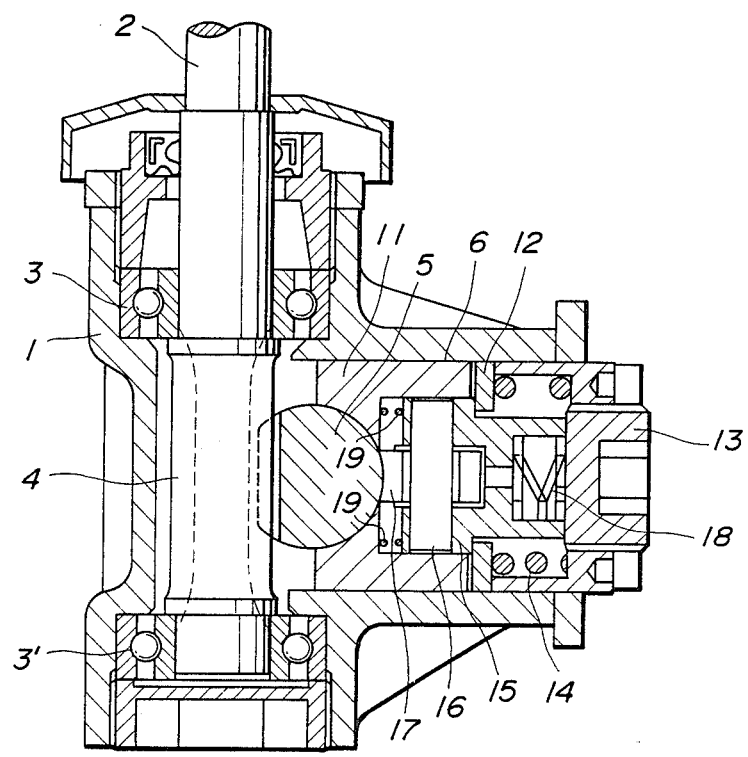
FIG. 4 is a vertically sectional view of a second preferred embodiment of the steering mechanism for an automobile constructed in accordance with the present invention.
Figure 5:
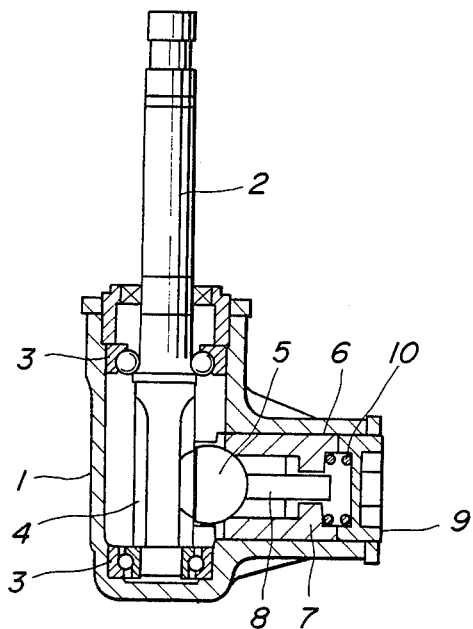
FIG. 5 is a vertically sectional view on a reduced scale of a prior art steering mechanism for an automobile.
Figure 6:
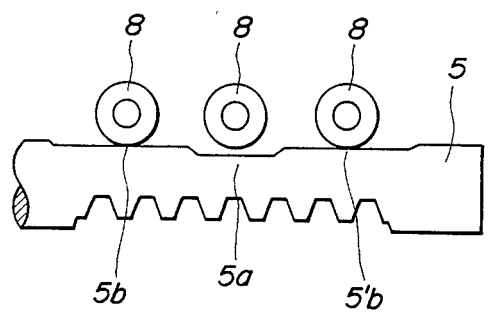
FIG. 6 is a side elevational view of the roller and rack bar employed in the prior art steering mechanism of FIG. 5.

Next referring to FIG. 4 which shows the second embodiment of the automobile steering mechanism according to the present invention. The second embodiment also generally comprises a housing 1 in which a column shaft 2 is supported by means of bearings 3, 3' which are in turn supported in the housing 1 in the conventional manner. A pinion 4 is mounted on the column shaft 2 and a rack bar 5 is provided in engagement with the pinion 4 at substantially right angles to the former. An opening 6 is defined in the housing 1 for the same purpose as described in connection with the first embodiment. A first yoke 11 is received in the opening 6 for axially slidable movement therin and the yoke 11 is adapted to abut at one end thereof against the rack bar 5 and at the other end of the yoke a ring 12 is located adjacent thereto. A yoke stopper 13 is fitted in the opening 6 at one or the outer end of the opening and a first spring 14 is interposed between the ring 12 and the yoke stopper 13 to normally bias the first yoke 11 and the ring 12 towards the rack bar 5 inwardly in the opening 6. Disposed within the first yoke 11 is a second yoke 15 which has a rotary shaft 16 mounted at the inner end of the second yoke. A roller 17 is rotatably mounted on the rotary shaft 16 and abuts against the rack bar 5. A second spring 18 is interposed between the yoke stopper 13 and the second yoke 15 to normally bias the roller 17 towards the rack bar 5. The construction and arrangement of the components in the second embodiment described are identical with those of the corresponding components in the first embodiment. However, in the second embodiment, a third spring 19 is further interposed between the first and second yokes 11, 15 and the ring 12 may be spaced from the first yoke 11.

Also in the second embodiment, like the first embodiment, the rack bar 5 is made rigid under a suitable friction by the abutment of the first yoke 11 and the roller 17 against the central area 5a of the side of the rack bar opposite from the pinion 4 and under a high load condition, since the principal load is born by only the roller 17, a high efficiency can be attained. Furthermore, since the third sping 19 is interposed between the first and second yokes 11, 15 to normally cause the rack bar 5 and the first yoke 11 to contact each other under a low load condition, the first yoke 11 is prevented from rattling.

As clear from the foregoing description on the preferred embodiments of the present invention, according to the present invention, since the rack bar is supported at the central area thereof by the roller and the first yoke, the rack bar is made rigid and a pinion torque at a proper value is provided. And since the rack bar is supported at the opposite ends thereof by only the roller, the frictional force is low and the efficiency is high. Thus, under a high load condition, a high efficiency is attained throughout the whole stroke of the rack bar. Furthermore, since the first yoke abuts against the rack bar at the central area of the rack bar and does not abut against only the curved opposite ends of the rack bar, the load on the rack bar by the first yoke is gradual. The load to be applied to the rack bar by the roller increases from the central area towards the opposite ends of the rack bar and the load is principally born by the roller at the opposite ends of the rack bar.

The advantages of the present invention, as well as certain changes and modifications of the disclosed embodiments thereof, will be readily apparent to those skilled in the art. It is applicant's intention to cover by the claims all those changes and modifications which could be made to the embodiments of the invention herein chosen for the spirit and scope of the invention.

What is claimed is:

1. A rack and pinion steering mechanism for an automobile comprising:

a housing;

a rack bar having rack gear teeth and being longitudinally displaceable in said housing;

a pinion rotatably mounted in said housing and having gear teeth that engage the rack gear teeth of said rack bar; and support means located between said rack bar and said housing on the side of said rack bar remote from said pinion for supporting said rack bar to maintain engagement of the rack gear teeth with the teeth of said pinion;

said support means comprising a first yoke having surface means at one end thereof for engaging said rack bar, first spring means for biasing said first yoke into engagement with said rack bar, a ring located adjacent said other end of said first yoke, said first spring means acting on said ring which transfers the spring force to said first yoke, roller means engaging an arcuate surface defining a longitudinally extending arcuate recess on said remote side of said rack bar, a second yoke for supporting said roller means, and second spring means acting between said second yoke and said housing for biasing said roller means into engagement with said arcuate surface;

said second yoke being movable relative to said first yoke and having surface means for engaging said ring to move said ring against the bias of said first spring means and relieve the force of said first spring means from acting on said first yoke when said roller means relative to said arcuate surface upon longitudinal displacement of said rack bar.

2. The steering mechanism for an automobile as set forth in claim 1 further including a third spring interposed between said first and second yokes for normally biasing said first yoke towards said rack bar.

3. A steering mechanism for an automobile as set forth in claim 1 wherein said ring is secured to said first yoke.

* * * * *